United States Patent
Challener, IV

Patent Number: 5,087,532
Date of Patent: Feb. 11, 1992

[54] DIRECT-OVERWRITE MAGNETO-OPTIC MEDIA

[75] Inventor: William A. Challener, IV, Little Canada, Minn.

[73] Assignee: Minnesota Mining and Manufacturing Company, St. Paul, Minn.

[21] Appl. No.: 388,121

[22] Filed: Aug. 1, 1989

[51] Int. Cl.$^5$ .............................. G11B 5/66
[52] U.S. Cl. ...................... 428/694; 428/900; 369/13; 369/14
[58] Field of Search ........... 428/694, 900; 360/131, 360/135; 365/122; 369/13, 14; 430/945

[56] References Cited

U.S. PATENT DOCUMENTS

| | | | |
|---|---|---|---|
| 4,559,573 | 12/1985 | Tanaka et al. | 360/131 |
| 4,612,587 | 9/1986 | Kaneko et al. | 360/59 |
| 4,649,519 | 3/1987 | Sun et al. | 365/122 |
| 4,679,180 | 7/1987 | Kryder et al. | 369/13 |
| 4,771,347 | 9/1988 | Horimai et al. | 360/59 |
| 4,794,560 | 12/1988 | Bell et al. | 365/122 |
| 4,893,910 | 1/1990 | Birecki | 350/377 |

FOREIGN PATENT DOCUMENTS

| | | |
|---|---|---|
| 0225141 | 6/1987 | European Pat. Off. |
| 0257530 | 3/1988 | European Pat. Off. |
| 0258978 | 3/1988 | European Pat. Off. |
| 0282356 | 9/1988 | European Pat. Off. |
| 3619618 | 12/1986 | Fed. Rep. of Germany |
| 3802693 | 8/1988 | Fed. Rep. of Germany |
| 060745 | 4/1984 | Japan |
| 219203 | 9/1987 | Japan |

OTHER PUBLICATIONS

J. Saito, M. Sato, H. Matsumoto, H. Akasaka, "Proc. Int. Symp. Optical Memory, 1987", Jpn. J. Appl. Phys. 26 (1987), Supp. 26-4, p. 155.

H.A.M. van den Berg, R. Roeckelein, IEEE Trans. Magn. MAG-25 (1989), 4036.

Primary Examiner—Merrell C. Cashion, Jr.
Assistant Examiner—Robert J. Follett
Attorney, Agent, or Firm—Gary L. Griswold; Warren R. Bovee; Peter Forrest

[57] ABSTRACT

A magneto-optic recording medium records data in a single, direct-overwrite step. The medium includes a magneto-optical storage layer and a magnetic biasing layer disposed in selected heat conductive relationship with the storage layer. The first magnetic field is generated externally of the storage layer at a first energy level of a laser to set the magnetic orientation of domains at the storage layer. At a second energy level of the laser, which is higher than the first energy level, the magnetic biasing layer provides a second magnetic field greater than the first magnetic field for setting the magnetic orientation of domains in the storage layer.

9 Claims, 4 Drawing Sheets

DIRECT-OVERWRITE MAGNETO-OPTIC MEDIA

BACKGROUND OF THE INVENTION

The present invention relates to magneto-optic storage media, and in particular, it relates to a direct-overwrite magneto-optic medium.

In magneto-optic recording, data is represented by a magnetized domain. A magnetized domain is a localized area which has a preferential magnetized orientation. Domain will herein refer to the smallest stable magnetizable region, although in common usage, a domain is a uniformly magnetized region of any size. The preferentially magnetized domain is often referred to as a "bit." The preferential magnetized orientation is caused by an energy source of sufficient intensity heating the medium above its Curie point temperature while the medium is simultaneously being biased by a magnetic field.

Typically, the energy source is a laser. The laser is used to heat the magnetic medium in the localized area. When the localized area exceeds the Curie temperature, then the magnetization direction is set by the magnetic field.

When the laser beam is removed, the bit cools in the presence of the biasing magnetic field and has its magnetization switched to that direction. The momentary temperature rise in the bit reduces the bit's coercive force so that the magnetic biasing field forces the magnetization of the domain to conform to the direction of the biasing magnetic field as the bit cools below its Curie point.

To write again on the recording media, conventional practice has been to erase what has been recorded. To accomplish the erasure, any given bit is exposed to a laser beam of sufficient intensity while also exposing that bit to a magnetic field in an opposition direction and permitting that bit to cool. This erasure step sometimes is referred to as an initialization step. The medium is then ready for writing on.

The conventional write-over procedure is constrained by two steps. The first being the erase or initialization step and the second being the recording or write-over step. There has been some work in attempting to provide a one-step overwrite system.

U.S. Pat. No. 4,794,560 (Bell et al.) describes an erasable magneto-optic medium having a first magnetic recording layer and a second magnetic biasing layer for providing a biasing field. Disposed between the first and second magnetic layers is a thermal isolation layer which provides a thermal barrier for controlling the temperature of the second magnetic biasing layer. When the medium is heated for a short time, the fringe field from the first layer causes one direction of magnetic orientation to occur in a domain in the first layer. Upon cooling of the domain, the domain magnetization becomes stable with an orientation conforming to the orientation of the fringe field. The thermal isolation layer prevents significant heating of the second magnetic layer. Further heating of the domain to erase, heats the second layer substantially to cause it to project the field opposite from the fringe field direction such that as cooling occurs, the orientation of the domain magnetization stabilizes and conforms to the projected field orientation.

U.S. Pat. No. 4,771,347 (Horimai et al.) describes a magneto-optic recording system which includes a magneto-optic recording layer and a biased magnetic layer. The magneto-optic recording layer has a Curie temperature higher than room temperature and the biased magnetic layer has a compensation temperature higher than the Curie temperature. A non-magnetic layer is disposed between the recording layer and the biased magnetic layer. A laser having first and second power levels is provided with the first power level being selected enough to heat the recording layer higher then the Curie temperature and to heat the biased magnetic layer higher than its compensation temperature, and the second power level being selected enough to heat the recording layer higher than the Curie temperature while keeping the biased magnetic layer below the compensation temperature of the biased layer.

West German published patent application DE 361,618 A1, and J. Saito, M. Sato, H. Matsumoto, H. Akasak, Tech. Digest and Int. Symp. on Optical Memory, WA-3 (Sept. 1987), describe a direct overwrite magneto-optic memory having a memory layer and a reference layer with the layers quantum exchange coupled. An initializing magnet is used to initialize the reference layer. At room temperature, the coercivity of the reference layer is larger than that of the memory layer and the Curie temperature of the reference layer is higher than that of the memory layer.

SUMMARY OF THE INVENTION

The present invention includes a magneto-optic recording medium in which new data can be recorded in a single direct-overwrite step without the need for an intermediate step of erasing the old data. The medium of the present invention includes a magneto-optic storage layer and a magnetic biasing layer disposed in a selected heat conductive relationship with the storage layer. The magnetic biasing layer has a coercivity level such that the biasing layer is not substantially affected by a first magnetic field used to set the magnetic orientation of domains on the storage layer. The domains on the storage layer are subjected to a first energy level, such as from a laser, with the magnetic orientation of the domains being determined by the first magnetic field produced externally of the storage layer.

When the storage layer is subjected to a second selected energy level, higher than the first, the biasing layer is heated to a temperature at which the biasing layer generates a second magnetic field in a direction opposite to the direction of the first magnetic field at the storage layer and at a level such that the magnetic orientation of bits of the storage layer are changed to the direction of the second magnetic field.

DETAILED DESCRIPTION OF THE PREFERRED EMBODIMENTS

Figure 1:
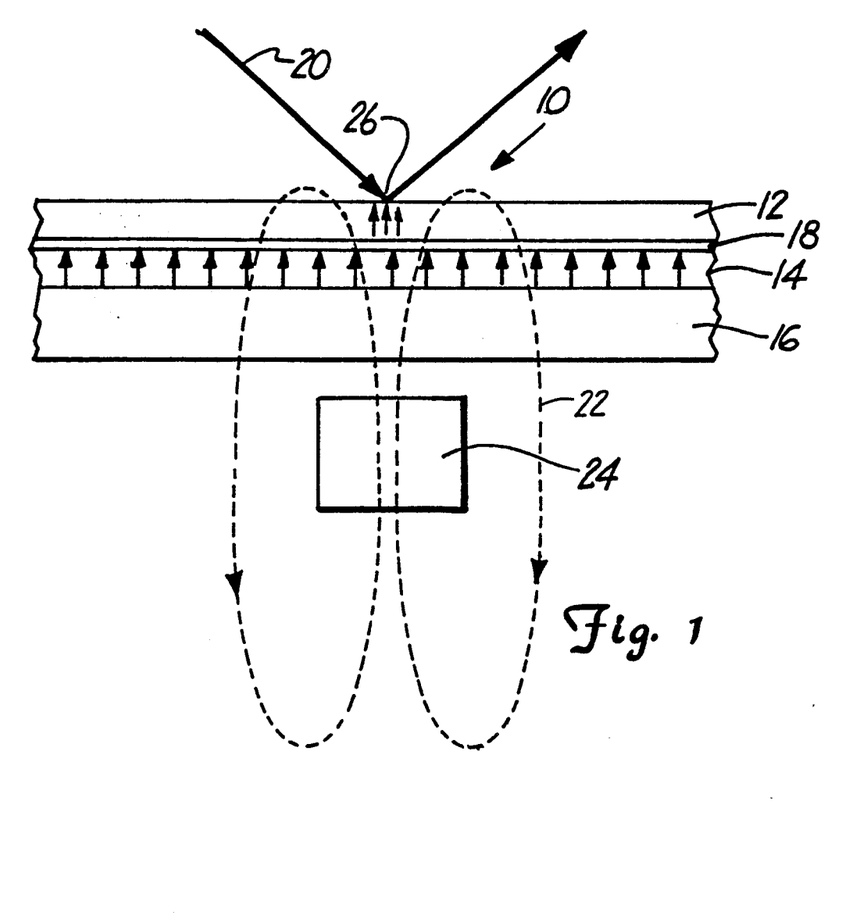
FIG. 1 is an illustrative view of an embodiment of the present invention incorporating an external magnet.

The magneto-optic recording medium of the present invention is generally illustrated at 10 in FIG. 1. The medium 10 includes a recording or storage layer 12 and a magnetic biasing layer 14. An insulating layer 18 is disposed between the recording layer 12 and the magnetic biasing layer 14.

All three layers are deposited on a substrate 16 using conventional sputtering techniques. Although the substrate 16 is illustrated with the magnetic biasing layer being supported first on the substrate 16 with the insulating layer and the storage layer being supported on the substrate thereafter, the order of the layers could be reversed. The substrate 16 could be made of an optically clear material such as polycarbonate and the recording layer 12 supported initially on the substrate 16 with the insulating layer and the magnetic biasing layer being supported on the substrate thereafter.

The storage layer 12 is designed so that the coercivity of the storage layer is large at ambient temperature but very low at the recording or writing temperature. Preferably the writing temperature is chosen at or slightly above the Curie temperature of the storage layer. A low power laser represented at 20 is preferably used to heat a bit 26 of the storage layer to the write or Curie temperature. The write temperature is chosen from a range which does not require high laser power but is high enough to provide stability at ambient temperatures. A suitable Curie temperature is chosen by varying the relative proportions of the rare earth metal and the transition metal. Suitable amorphous alloys may be made of terbium and iron.

To effect a preferentially directed magnetization of the bit 26, a magnetic field 22 is generated by a source 24, that is external of the storage layer and the biasing layer 16, such as an external magnet. The magnetic field 22 aligns the magnetization of the bit 26 as the bit cools in what will be referred to as the "up" direction for purposes of this application.

The insulating layer 18 separates the storage layer 12 and the magnetic biasing layer 14 preventing quantum exchange coupling between the layers. In addition, the insulating layer 18 selectively insulates the magnetic biasing layer 14 by controlling heat conduction as will be discussed subsequently. SiOx is one preferred material for the insulating layer. The insulating layer may also be made of a metal alloy depending on the insulative properties (heat conductive properties) desired. In addition, the insulative layer may also be reflective such that energy is transmitted to the biasing layer only through conduction.

The magnetic biasing layer 14 has a pre-aligned magnetization in what will be referred to as the "up" direction for purposes of this application, or in the same direction as the magnetic field produced by the magnet 24 at the storage layer. The net effect of the magnetization of the magnetic biasing layer 14 is negligible or zero at the Curie or write temperature of the storage layer 12. Consequently, the magnetic biasing layer 14 has no affect on the storage layer during the "write" function.

Figure 2:
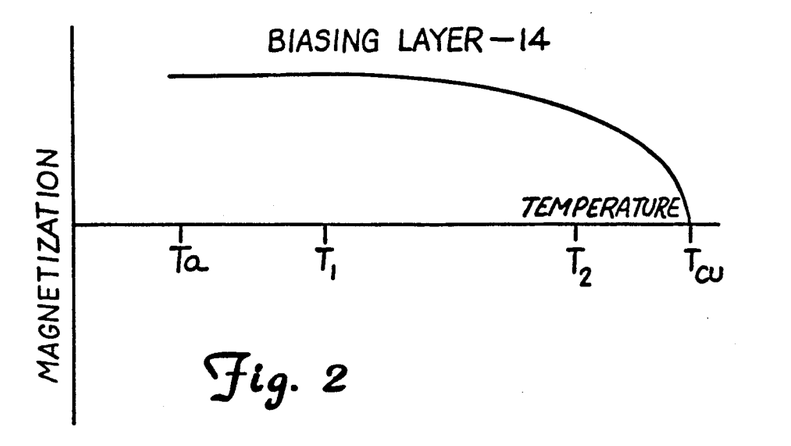
FIG. 2 is a graphical view of the magnetization of the biasing layer of FIG. 1.

The magnetization of the biasing layer is relatively constant between ambient temperature ($T_a$) and a selected elevated temperature ($T_1$), as illustrated in FIG. 2. The insulative properties of the layer 18 are such that at the write temperature of the storage layer, the temperature of the magnetic biasing layer does not exceed $T_1$. Between $T_a$ and $T_1$, the biasing layer has substantially uniform magnetization. An infinite, uniformly magnetized plane such as the biasing layer produces an external magnetic field that is zero. Consequently, the magnetic biasing layer does not produce an external magnetic field that would affect the storage layer.

When the laser is modulated to a higher energy level raising the temperature of the storage layer above the write temperature, the temperature of the magnetic biasing layer rises above $T_1$. The magnetic biasing layer is configured so that when the temperature rises above $T_1$, the magnetization of the magnetic biasing layer changes, producing an external magnetic field greater than the magnetic field at the storage layer from the magnet 24. In addition, the coercivity of the storage layer above the write temperature is zero.

The coercivity of the magnetic biasing layer is sufficiently high enough so that the field of the external magnet 24 has no effect on the direction of magnetization of the biasing layer 14. The Curie temperature of the magnetic biasing layer is above $T_2$ as indicated by $T_{cu}$ in FIG. 2. Preferably, the compensation temperature $T_{co}$ is below $T_a$.

In operation, preferably a single laser is used to provide low energy laser power for recording on the layer 12 at the write temperature and a higher energy laser power for erasing what has been stored. The laser is modulated between these two energy levels. The characteristics of the magneto-optic recording medium of the present invention respond to the modulation of the laser in both the write function and the erase function as needed. For example, when the laser heats the storage layer to the write temperature, the magnetization state at the bit will be set by the field from the external magnet. The field of the external magnet is large enough to overcome any demagnetizing field (fringe field) of the storage layer. Furthermore, the coercivity of the biasing layer is too great for the magnetization of the biasing layer to be affected by the field of the external magnet. Since the external field of the biasing layer is negligible below $T_1$, it has little effect on the storage layer at the write temperature.

When the laser is modulated to pulse at a higher level, that is the storage layer is heated above the write temperature and the biasing layer is heated above temperature $T_1$, the magnetization of the biasing layer changes dramatically and gives rise to an external field at the storage layer greater than the field produced by the external magnet. The field produced by the biasing layer at the storage layer is in an opposite direction to the direction of magnetization that the bit was set by the external magnet. Since the field generated by the biasing layer above temperature $T_1$ is greater than the field generated by the external magnet, the external magnet has no effect on the direction of magnetization of the bit at temperatures above the write temperature. The size of the field generated by the biasing layer at the storage layer is determined by the positional dependence of the magnetization in the biasing layer and the thickness of the biasing layer and the separation between the biasing and storage layers.

The thermal properties of the insulating layer and the biasing layer are configured so that the biasing layer cools slowly enough so that its field is always larger than the field from the external magnet above $T_1$. As the bit cools below the Curie temperature, its magnetization is set by the bias layer. In this way, the biasing layer determines the final magnetization step of the storage layer when the storage layer is heated above the write temperature.

Figure 3:
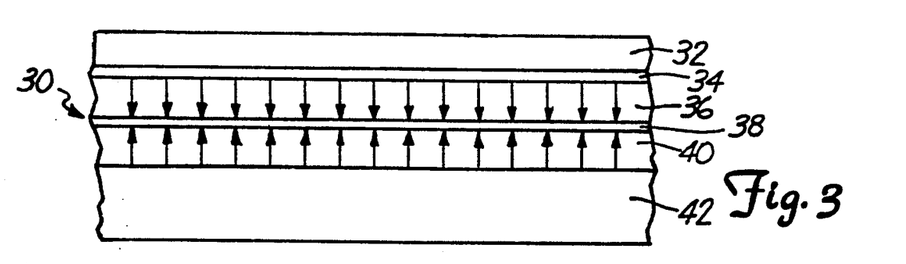
FIG. 3 is a cross-sectional view of an alternative embodiment of the present invention using no external magnet.

An alternative embodiment 30 of the present invention is illustrated in FIG. 3. The embodiment 30 includes a storage layer 32, a first insulating layer 34, a first biasing layer 36, a second insulating layer 38, and a second biasing layer 40, all supported on a substrate 42.

The composition of the layers 32, 36, and 40 are amorphous alloys of terbium, iron, and cobalt, or other suitable rare earth and transition metals which provide the properties discussed below. The insulating layers 34 and 38 are made of a non-magnetic material such as $SiO_x$ material or of a metal alloy. In addition, the first insulating layer 34 or the second insulating layer 38 or both layers 34 and 38 may be reflective layers so that radiative energy is not transmitted and energy is transmitted only through conduction from the layer 32 to the first biasing layer 36 or the first and second biasing layers 36 and 40. The substrate 42 is typically made of a polymeric material. If the order of the layers is reversed such that the storage layer 32 is deposited initially on the substrate 42, then the substrate 42 is made from an optically clear plastic such as polycarbonate.

In the embodiment illustrated in FIG. 3, there is no need for an external magnet to cause an external magnetic field for the "write" function and recording data on the storage layer 32.

Figure 4A:
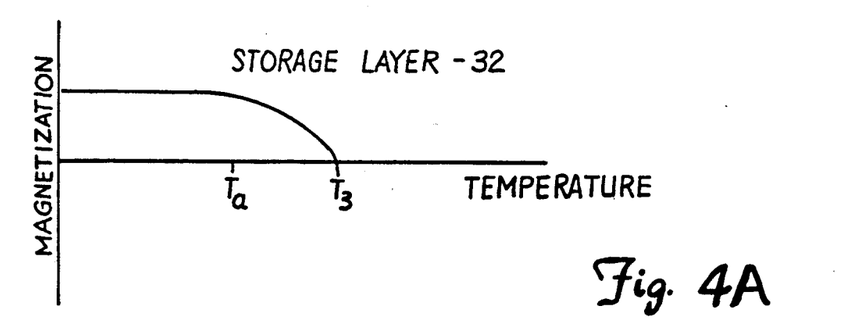
FIGS. 4A, 4B, and 4C are graphical views of the magnetization of the storage layer, first biasing layer, and second biasing layer of the embodiment of FIG. 3.
Figure 4B:
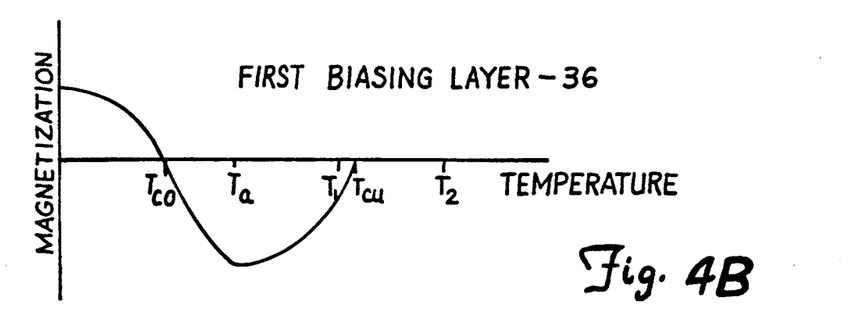
Figure 4C:
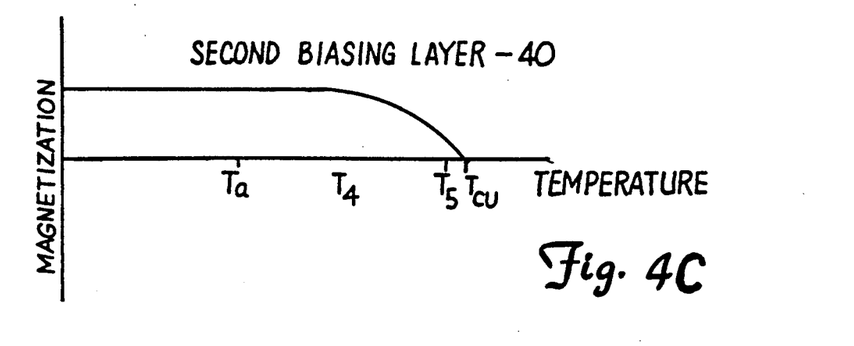

The magnetization of the magnetic layers of the embodiment 30 are illustrated in FIG. 4. The storage layer 32 is designed so that the coercivity is large at ambient temperature but very low at the write temperature ($T_3$). The write temperature ($T_3$) as in the embodiment of FIGS. 1 and 2 is chosen at the Curie temperature of the storage layer.

The first biasing layer has a compensation temperature ($T_{co}$) that is below ambient temperature ($T_a$). The first biasing layer also has a Curie Temperature ($T_{cu}$) that is above $T_1$. The second biasing layer has a Curie temperature ($T_{cu}$) that is above $T_5$. An external magnet is used to pre-align the magnetization of the first and second biasing layers below the compensation temperature such that when the layers are warmed back to $T_a$, the first and second biasing layers are magnetized in opposite orientations, as illustrated in FIG. 3. Once the biasing layers are initialized, the external magnet is no longer needed.

When a low power laser pulse heats the storage layer 32 to $T_3$, the first biasing layer is heated to $T_1$ and the second biasing layer is heated to $T_4$. At $T_1$, the first biasing layer generates an external magnetic field that affects the magnetization orientation of the bit on the layer 32 as the bit is permitted to cool below $T_3$. The external field of the first biasing layer is larger than the demagnetizing field of the storage layer 32, and at $T_4$, the magnetization of the second biasing layer undergoes minimal change, generating a negligible external field at the storage layer 32.

Figure 5:
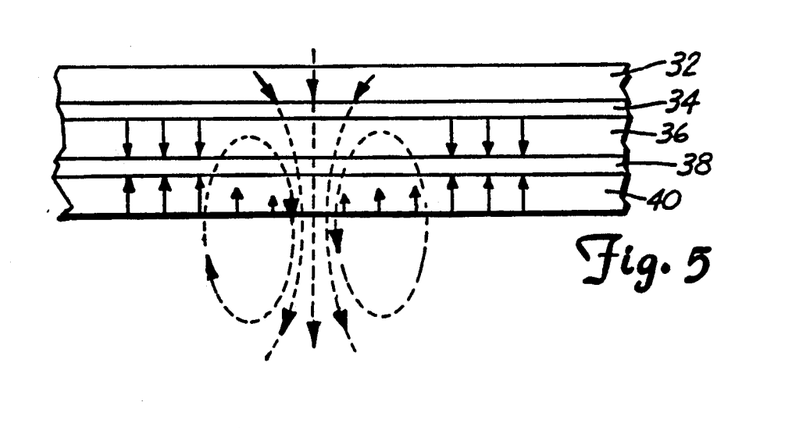
FIG. 5 is a cross-sectional view illustrating the effect of the magnetic field of the third biasing layer.

When a higher laser pulse is used to heat the storage layer above $T_3$ such that the first biasing layer reaches $T_2$ and the second biasing layer reaches $T_5$, the magnetizations of both the first and second biasing layers are changed substantially. Both the first and second biasing layers at $T_2$ and $T_5$ generate external magnetic fields at the storage layer. However, at $T_5$, the external magnetic field of the second biasing layer is much greater than the external magnetic field generated by the first biasing layer and the demagnetizing field of the storage layer 32. At $T_5$, the direction of the magnetization of the storage layer bit will be determined by the external magnetic field of the second biasing layer as the bit cools below $T_3$. It is important that the thermal properties of the insulating layers 34 and 38 are controlled so that the storage layer and the first biasing layer cool more quickly than the second biasing layer such that the storage layer reaches $T_3$ while the magnetic field of the second biasing layer is sufficiently large to set the magnetization of the bit. The same holds true for the first biasing layer such that when the first biasing layer cools below its Curie temperature, the field from the second biasing layer is larger than the demagnetizing field within the first biasing layer so that the first biasing layer recovers its original magnetization state, as illustrated in FIG. 5.

Figure 6:
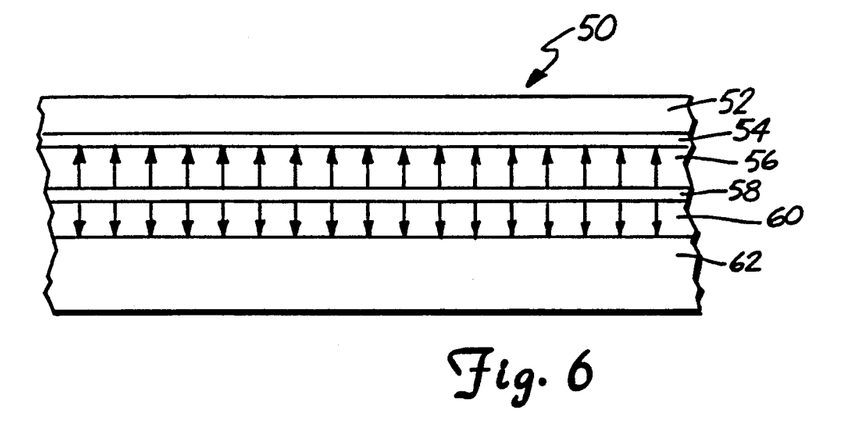
FIG. 6 is a cross-sectional view of yet another alternative embodiment of the present invention using no external magnet.
Figure 7A:
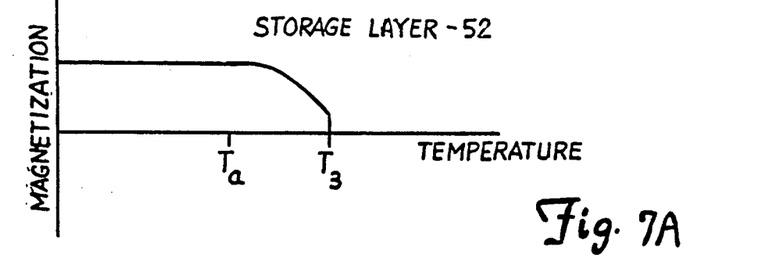
FIGS. 7A, 7B, and 7C are graphical views of the magnetization of the storage layer, first biasing layer, and second biasing layer of the embodiment of FIG. 6.
Figure 7B:
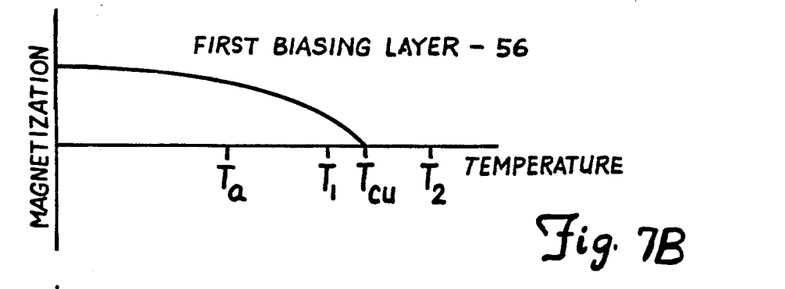
Figures 7C, 8:
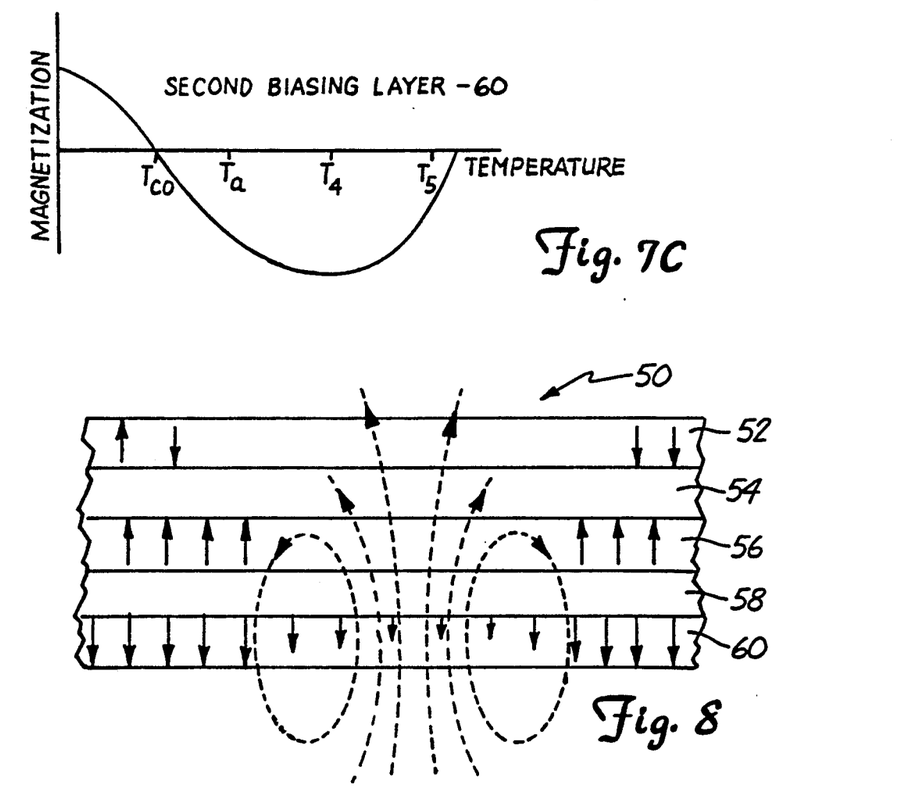
FIG. 8 is a cross-sectional view of the embodiment of FIG. 6 illustrating the effect of the magnetic field of the second biasing layer.

An alternative embodiment 50 is illustrated in FIGS. 6 through 8. The embodiment 50 includes a storage layer 52, a first insulating layer 54, a first biasing layer 56, a second insulating layer 58, a second biasing layer 60, all supported on a substrate 62. The embodiment 50 is essentially the same as the embodiment 30 discussed with respect to FIGS. 3 through 5, except that the orientation of magnetization of the biasing layers 56 and 60 are reversed.

As illustrated in FIG. 7, the storage layer 52 is essentially the same as the storage layer 32 of FIG. 4. The coercivity of the storage layer 52 is large at ambient temperature but very low at the write temperature ($T_3$). In addition, the write temperature is chosen at the Curie temperature.

The first biasing layer has a Curie Temperature ($T_{cu}$) that is above $T_1$.

Once again, an external magnet is used to pre-align the magnetization of the first and second biasing layers below the compensation points such that when the layers are warmed back to $T_a$, the first and second biasing layers are magnetized in opposite directions. An external magnet is no longer needed once the initialization is done.

When a low power laser pulse heats the storage layer 52 to $T_3$, the first biasing layer is heated to $T_1$ and the second biasing layer is heated to $T_4$. At $T_1$, the first biasing layer generates an external magnetic field that affects the magnetization of the bit on the layer 52 as the bit is permitted to cool below $T_3$. At $T_4$, the magnetization of the second biasing layer is essentially uniform, generating a negligible external field at $T_4$.

When a greater laser pulse is used to heat the storage layer 52 above $T_3$ such that the first biasing layer reaches $T_2$ and the second biasing layer reaches $T_5$, the magnetizations of both the first and second biasing layers are changed substantially. Both the first and second biasing layers at $T_2$ and $T_5$ generate external magnetic fields at the storage layer. However, at $T_5$, the external magnetic field of the second biasing layer is much greater than the external magnetic field generated by the first biasing layer and the demagnetizing field of the storage layer 52. At $T_5$, the direction of the magnetization of the storage layer bit will be determined by the magnetic field of the second biasing layer as the bit cools below $T_3$.

Again, as discussed with respect to the embodiment 30, it is important that the thermal properties of the layers are controlled so that the storage layer and the first biasing layer cool more quickly than the second biasing layer in order to set the magnetization state of the storage layer and the second biasing layer by the second biasing layer 60 before its field becomes too small.

As illustrated in FIG. 8, the field from the second biasing layer sets the direction of magnetization of the storage layer. In addition, the second biasing layer 60 ensures that the direction of magnetization of the first biasing layer be in an up direction, that is opposite to the direction of magnetization of the second biasing layer.

PREDICTED DESIGN EXAMPLE

A possible substrate-incident disk design would begin with a transparent protective layer such as $SiO_x$ or SiC deposited on the substrate, followed by a TbFe or TbFeCo layer with preferably a composition given by $Tb_{(x)}[Fe_{(1-y)}Co_{(y)}]_{(1-x)}$ where $0.15<x<0.30$ and $0<y<0.20$. The specific composition would be adjusted to have $T_{co}$ at about ambient temperature. A second SiC or $SiO_x$ layer would follow to act as an insulator between the storage and bias layer. Its thickness would be chosen to be thin enough that the bias layer could generate a sufficiently strong field at the position of the storage layer. However, its thickness and thermal conductivity would also be chosen to obtain the correct thermal time sequence during write and erase pulses for the storage and bias layers. The bias layer would be a TbFeCo alloy with composition given from the formula $Tb_{(r)}[Fe_{(1-s)}Co_{(s)}]_{(1-r)}$ where $0.10<r<0.40$ and $0.1<s<0.8$. The specific composition would be chosen to have a relatively constant magnetization between ambient and $T_{cu}$ of the storage layer, and $T_{cu}>>T_{cu}$ of the storage layer. It would be chosen thick enough to provide the required magnetic field strengths at the position of the storage layer. Finally, additional protective layers of $SiO_x$, SiC, and/or metallic reflectors would be added. For an air incident disk, the stack sequence would be reversed.

Although the present invention has been described with reference to preferred embodiments, workers skilled in the art will recognize that changes may be made in form and detail without departing from the spirit and scope of the invention.

I claim:

1. A magneto-optic recording medium for use with a single laser beam operable at a first energy level and a second energy level higher than the first energy level and a magnetic field source generating a first magnetic field, the medium comprising:

a substrate;

a magneto-optic storage layer, supported on the substrate, for maintaining areas of selected magnetic orientation;

a magnetic biasing layer supported on the substrate in selected heat conductive relationship with the storage layer and having a coercivity level such that the magnetization of the biasing layer is not substantially affected by the first magnetic field, and having a Curie temperature such that the magnetization generally monotonically decreases from a non-zero value at ambient temperature to zero at the Curie temperature;

an insulating separating the storage layer and the biasing layer;

wherein when the storage layer is subjected to the first energy level, the first magnetic field sets the magnetic orientation of the areas of the storage layer; and wherein when the storage layer is subjected to the second energy level, the biasing layer is heated to a first temperature at which the biasing layer generates a second magnetic field in a direction and at a level such that the magnetic orientation of the areas of the storage layer are changed.

2. The medium of claim 1 wherein the insulating layer is a reflective layer.

3. A magneto-optic recording medium for use with a laser beam operable at a first energy level and at a second energy level higher than the first energy level, the medium comprising:

a substrate;

a first magnetic layer, supported on the substrate, for retaining at least one domain having a selected orientation of magnetization;

a second magnetic layer for generating a first magnetic field to set the magnetic orientation of the domain in a first direction;

a third magnetic layer for generating a second magnetic field greater than the first magnetic field, which second magnetic field sets the orientation of the domain in a second direction opposite to the first direction, the third magnetic layer being supported on the substrate in heat conductive relationship with the first magnetic layer, and having a coercivity such that the first magnetic field has negligible effect on the magnetization of the third magnetic layer, and having a Curie temperature such that the magnetization of the third magnetic layer generally monotonically decreases from a non-zero value at ambient temperature to zero at the Curie temperature;

a first insulating layer between the first and remaining magnetic layers; and a second insulating layer separating the second and third magnetic layers.

4. The medium of claim 3 wherein the second magnetic layer is in heat conductive relationship with the first and third magnetic layers such that when the first magnetic layer is subjected to the second energy level the second magnetic layer is heated above the second magnetic layer's Curie temperature; and wherein the third magnetic layer is insulated such that the first and second magnetic layers cool below the first and second magnetic layers's respective Curie temperatures while the second magnetic field exists.

5. The medium of claim 4 wherein the third magnetic layer generates negligible magnetic fields when the first magnetic layer is subjected to the first energy level and when the first magnetic layer is subjected to the second energy level, the third magnetic layer generates the magnetization of the second magnetic field which sets the magnetic orientation of the domain.

6. The magneto-optic recording medium of claim 1 in which the biasing layer is insulated such that the biasing layer is at a second temperature, less than the first temperature, when the storage layer is subjected to the first energy level; and in which the magnetization of the biasing layer is generally constant between ambient temperature and the second temperature.

7. The magneto-optic recording medium of claim 3 in which the magnetization of the third magnetic layer is generally constant between ambient temperature and the temperature of the third magnetic layer when the selected orientation of magnetization of the domain of the first magnetic layer is set.

8. A magneto-optic recording medium for use with a single laser beam operable at a first energy level and a second energy level higher than the first energy level and a magnetic field source generating a first magnetic field, the medium comprising:
   a substrate;
   a magneto-optic storage layer, supported on the substrate, for maintaining areas of selected magnetic orientation;
   a magnetic biasing layer supported on the substrate in selected heat conductive relationship with the storage layer and having a coercivity level such that the magnetization of the biasing layer is not substantially affected by the first magnetic field, and having a compensation temperature which is substantially less than ambient temperature;
   an insulating layer separating the storage layer and the biasing layer;
   wherein when the storage layer is subjected to the first energy level, the first magnetic field sets the magnetic orientation of the areas of the storage layer; and
   wherein when the storage layer is subjected to the second energy level, the biasing layer is heated to a first temperature at which the biasing layer generates a second magnetic field in a direction and at a level such that the magnetic orientation of the areas of the storage layer are changed.

9. A magneto-optic recording medium for use with a laser beam operable at a first energy level and at a second energy level higher than the first energy level, the medium comprising:
   a substrate;
   a first magnetic layer, supported on the substrate, for retaining at least one domain having a selected orientation of magnetization;
   a second magnetic layer for generating a first magnetic field to set the magnetic orientation of the domain in a first direction;
   a third magnetic layer for generating a second magnetic field greater than the first magnetic field, which second magnetic field sets the orientation of the domain in a second direction opposite to the first direction, the third magnetic layer being supported on the substrate in heat conductive relationship with the first magnetic layer, and having a coercivity such that the first magnetic field has negligible effect on the magnetization of the third magnetic layer, and having a compensation temperature which is substantially less than ambient temperature;
   a first insulating layer between the first and remaining magnetic layers; and
   a second insulating layer between the second and third magnetic layers.

* * * * *

UNITED STATES PATENT AND TRADEMARK OFFICE
CERTIFICATE OF CORRECTION

PATENT NO. : 5,087,532

DATED : February 11, 1992

INVENTOR(S) : William A. Challener, IV

It is certified that error appears in the above-identified patent and that said Letters Patent is hereby corrected as shown below:

Column 3, line 68, delete "affect" and insert --effect--.

Column 7, line 67, after the word "insulating" and before the word "separating" insert the word --layer--.

Signed and Sealed this

Thirteenth Day of April, 1993

*Attest:*

STEPHEN G. KUNIN

*Attesting Officer*     *Acting Commissioner of Patents and Trademarks*